H. W. WALK.
BICYCLE STAND.
APPLICATION FILED JULY 3, 1915.

1,159,139. Patented Nov. 2, 1915.

Inventor
H. W. Walk
Attorneys

UNITED STATES PATENT OFFICE.

HERMAN W. WALK, OF CHICAGO, ILLINOIS.

BICYCLE-STAND.

1,159,139.  Specification of Letters Patent.  Patented Nov. 2, 1915.

Application filed July 3, 1915. Serial No. 37,857.

*To all whom it may concern:*

Be it known that I, HERMAN W. WALK, a citizen of the United States, residing at Chicago, in the county of Cook and State of Illinois, have invented certain new and useful Improvements in Bicycle-Stands, of which the following is a specification.

This invention relates to improvements in devices for holding bicycles, motor cycles and the like in upright position when standing stationary and not in use, and the invention has for its object to provide a novel and improved stand or prop for this purpose which is carried by the machine, and which, when not in use, can be swung out of supporting position, in which position it is securely held by a catch, the latter being so constructed and arranged that it automatically assumes a locking position after the stand is swung into inoperative position.

The object stated is attained by means of a combination and arrangement of parts to be hereinafter described and claimed, reference being had to the accompanying drawing in which—

Figures 1, 2:
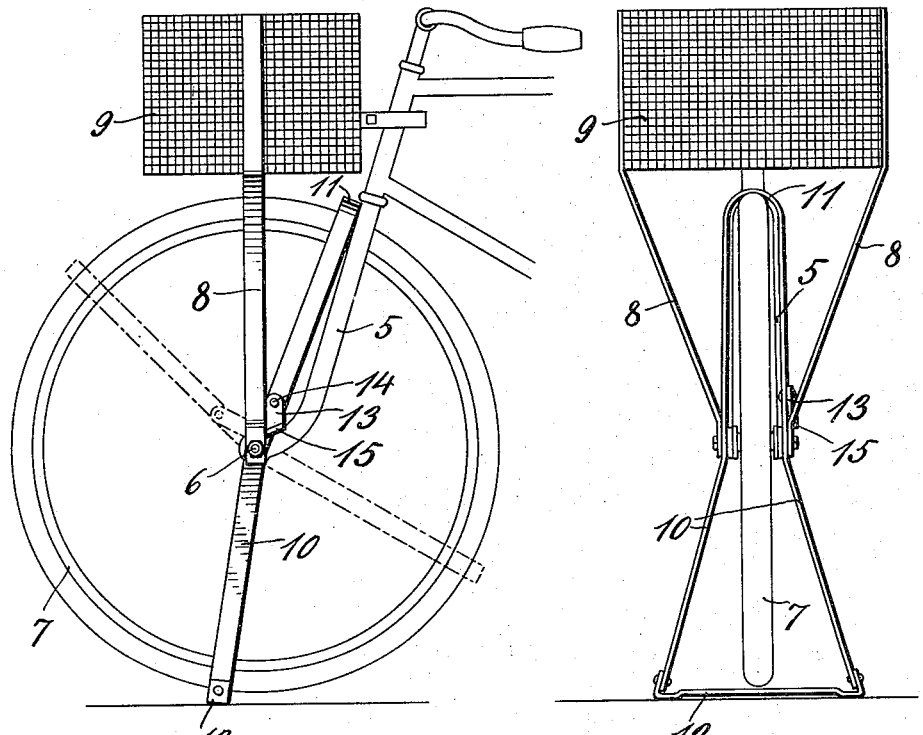
Figures 3, 4:
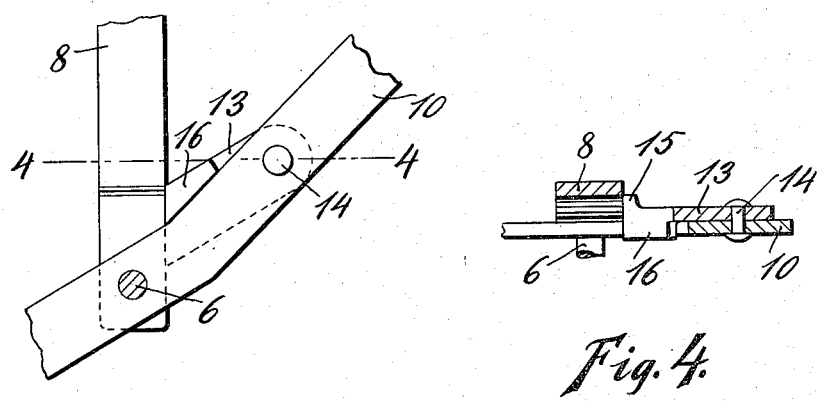

Figure 1 is a side elevation of a fragment of a bicycle showing the stand in supporting position; Fig. 2 is a front elevation thereof; Fig. 3 is an enlarged detail view of the prop which holds the stand in elevated position, the reverse side of the prop being shown, and Fig. 4 is a sectional detail on the line 4—4 of Fig. 3.

Referring specifically to the drawing, 5 denotes the front fork of a bicycle or the like, carrying a stationary axle 6 on which the front wheel 7 is mounted. On the ends of the axle are also mounted standards 8, rising to a suitable height and supporting at their upper ends a luggage carrier 9.

The stand or prop which is the subject matter of the present application for patent comprises a fork consisting of side bars 10 connected at their upper ends by an integral bend 11, and at their lower ends by a cross bar 12 which latter forms the base or foot of the stand. The axle 6 supports the stand, the side bars having apertures to receive the axle, and said side bars are loosely mounted on the axle to provide a pivotal support for the stand. That portion of the side bars which is above the axle is located in front of the fork 5. The length of the stand is such that the bend 11 is clear of the wheel 7, and the base bar 12 reaches the ground when the stand is in supporting position. The stand straddles the wheel, the distance between the side bars being such that they clear the latter.

The upper end of one of the side bars 10 of the stand carries a catch 13 for holding the stand in elevated position, said catch being pivotally connected at one end, as indicated at 14, to the side bar, and its opposite or free end is beveled or cut off obliquely, and provided at one side with a reinforcement rib 15. On the other side of the catch, the free end thereof has a lug or abutment 16 for a purpose to be presently described.

The upper and lower portions of the bars 10 are not in alinement, but are at an angle, so that when the stand is in supporting position the upper portion, which is above the axle 6, slants rearward, the bend 11 resting against the fork 5, whereas the lower portion, which is below the axle, extends downward therefrom with a slight forward slant, the base bar 12 resting on the ground. The stand thus provides a stable support for the machine, the fork 5 and the inclination of the lower half of the stand preventing the stand from accidentally tilting out of supporting position. The lower ends of the bars 10 also diverge to provide a wide supporting base.

The bars 10 are mounted on the axle 6 between the standards 8 and the ends of the hub of the wheel 7. The catch 13 is located close to the axle, but the standards 8 diverge so that the catch can swing past the same when the stand is swung from supporting to elevated position, and vice versa. The catch is on the outer face of one of the side bars 10 and the lug 16 is on the inner face of the catch.

When the stand is down in supporting position as shown in Fig. 1, the catch 13 is behind the adjacent standard 8, free of the same. To elevate the stand into inoperative position, the upper end is swung forward and downward, whereupon the lower end swings upward and rearward, away from the ground. As the upper end of the standard swings forward, the catch 13 pass the standard 8 without coming in contact with, but as the catch passes the standard and comes in front thereof and below, it engages the front edge of the standard as shown dotted in Fig. 1, the standard here being close to the bar 10 carrying the catch. The lug 16 is so located that it engages the top edge of the side bar 10 when the latter swings down, said lug thus serving as a stop to prevent the catch from swinging down below the side bar. The oblique free edge of the catch now engages the front edge of the standard 8, and as the catch cannot swing down, the stand is securely held in elevated position. To lower the stand it is necessary only to swing it back to the full line position shown in Fig. 1 after tilting the upper end down a bit and lifting the catch slightly to clear the standard.

The device is very simple and inexpensive in construction, and easy to operate, and it therefore effectually serves the purpose for which it is designed. The position of the stand when in elevated position is governed by the angle of the oblique end of the catch 13.

I claim:—

1. The combination with a bicycle, of a supporting stand therefor, said stand comprising spaced side bars pivoted on the front axle of the bicycle on opposite sides of the front wheel and in front of the front fork, and having a connection at their upper ends to engage said fork when the stand is in supporting position, the lower ends of the side bars in said position of the stand extending down from the axle to the ground, and means for holding the stand in elevated position clear of the ground, said means comprising a standard rising from the front axle, and a pivoted catch carried by one of the side bars and engaging the front of the standard when the stand is in elevated position.

2. The combination with a bicycle, of a supporting stand therefor, said stand comprising spaced side bars pivoted on the front axle of the bicycle on opposite sides of the front wheel and in front of the front fork, and having a connection at their upper ends to engage said fork when the stand is in supporting position, the lower ends of the side bars in said position of the stand extending down from the axle to the ground, and means for holding the stand in elevated position clear of the ground, said means comprising a standard rising from the front axle, and a pivoted catch carried by one of the side bars, said catch having an oblique free end engaging the front of the standard when the stand is in elevated position.

3. The combination with a bicycle, of a supporting stand therefor, said stand comprising spaced side bars pivoted on the front axle of the bicycle on opposite sides of the front wheel and in front of the front fork, and having a connection at their upper ends to engage said fork when the stand is in supporting position, the lower ends of the side bars in said position of the stand extending down from the axle to the ground, and means for holding the stand in elevated position clear of the ground, said means comprising a standard rising from the front axle, and a pivoted catch carried by one of the side bars and engaging the front of the standard when the stand is in elevated position, and a stop lug on one side of the catch engaging the side bar.

4. The combination with a bicycle, of a supporting stand therefor, said stand comprising spaced side bars pivoted on the front axle of the bicycle on opposite sides of the front wheel and in front of the front fork, and having a connection at their upper ends to engage said fork when the stand is in supporting position, the lower ends of the side bars in said position of the stand extending down from the axle to the ground, and means for holding the stand in elevated position clear of the ground, said means comprising a standard rising from the front axle, and a pivoted catch carried by one of the side bars, said catch having an oblique free end engaging the front of the standard when the stand is in elevated position, and a stop lug on one side of the catch engaging the side bar.

5. The combination with a bicycle, of a supporting stand therefor pivoted to the front axle, and means for holding the stand in elevated position clear of the ground, said means comprising a standard rising from the front axle, and a pivoted catch carried by one of the side bars and engaging the front of the standard when the stand is in elevated position.

6. The combination with a bicycle, of a supporting stand therefor pivoted to the front axle, and means for holding the stand in elevated position clear of the ground, said means comprising a standard rising from the front axle, and a pivoted catch carried by one of the side bars, said catch having an oblique free end engaging the front of the standard when the stand is in elevated position.

7. The combination with a bicycle, of a supporting stand therefor pivoted to the front axle, and means for holding the stand in elevated position clear of the ground, said means comprising a standard rising from the front axle, and a pivoted catch carried by one of the side bars and engaging the front of the standard when the stand is in elevated position, and a stop lug on one side of the catch engaging the side bar.

8. The combination with a bicycle, of a supporting stand therefor pivoted to the front axle, and means for holding the stand in elevated position clear of the ground, said means comprising a standard rising from the front axle, and a pivoted catch carried by one of the side bars, said catch having an oblique free end engaging the front of the standard when the stand is in elevated position, and a stop lug on one side of the catch engaging the side bar.

In testimony whereof I affix my signature in presence of two witnesses.

HERMAN W. WALK.

Witnesses:
S. J. LEHRER,
H. G. BATCHELOR.

Copies of this patent may be obtained for five cents each, by addressing the "Commissioner of Patents, Washington, D. C."